United States Patent [19]

Chamberlain

[11] 4,026,991

[45] May 31, 1977

[54] PROCESS FOR STABILIZING LIME MUD

[75] Inventor: Ralph Joseph Chamberlain, Stamford, Conn.

[73] Assignee: American Cyanamid Company, Stamford, Conn.

[22] Filed: July 12, 1976

[21] Appl. No.: 704,701

Related U.S. Application Data

[63] Continuation-in-part of Ser. No. 622,597, Oct. 15, 1975, which is a continuation of Ser. No. 452,902, March 20, 1974, abandoned.

[52] U.S. Cl. .............................. 423/177; 423/268; 423/637

[51] Int. Cl.$^2$ ......................................... C01F 11/06

[58] Field of Search .......... 423/175, 177, 267, 637, 423/268

[56] References Cited

UNITED STATES PATENTS 3,388,990    6/1968    Maruta et al. .......................... 71/64

*Primary Examiner*—O. R. Vertiz
*Assistant Examiner*—Wayne A. Langel
*Attorney, Agent, or Firm*—Harry H. Kline

[57] ABSTRACT

There is provided a process for stabilizing lime mud so as to eliminate balling during calcination of the same by incorporating a surface active agent decomposable at a temperature below 1500° F into lime mud comprising calcium carbonate, filtering said treated lime mud, and thereafter calcining said treated lime mud to recover calcium oxide absent any balling during calcination.

8 Claims, No Drawings

PROCESS FOR STABILIZING LIME MUD

This is a continuation-in-part of my co-pending application, Ser. No. 622,597, filed on Oct. 15, 1975, which in turn is a continuation of my application, Ser. No. 452,902, filed on Mar. 20, 1974, now abandoned.

The present invention relates to the stabilization of lime mud. More particularly, it relates to the treatment of lime mud with a surface active agent decomposable at a temperature below 1500° F to stabilize the same for purposes of effecting rapid, free-flow transfer to a calciner and economical calcining of the so-treated mud in the absence of balling the mud during calcination.

It is known that large quantities of calcium carbonate or lime mud are obtained in the Kraft process for producing paper. The calcium carbonate in the form of a mud is calcined in a kiln and converted to calcium hydroxide by way of calcium oxide. The latter is then employed to convert sodium carbonate green liquor to sodium hydroxide, which liquor is then removed as a white liquor and the residue or mud remaining is withdrawn as a wet lime mud or calcium carbonate. Unfortunately, the latter cannot be easily and economically treated to convert the same to calcium hydroxide. The lime mud is wet, usually as a 30–40% slurry, and must be filtered to remove large amounts of water. Filtering is necessary to keep the water entering the kiln to a minimum thereby reducing fuel costs. A screw auger or equivalent conveyor moves the cake discharged from the filter into the kiln where calcination takes place. Usually, the filter cake has such a putty-like consistency that the auger screw continously plugs up and, when the cake finally reaches the kiln, calcium carbonate balling occurs. To remedy the fouling of the auger screw conveyor, it is customary to wash down the auger conveyor continuously with water under pressure. This merely increases the amount of water taken up by the lime mud. Such a procedure is not satisfactory for the reason that additional energy is needed to drive off the water wash. This requires additional fuel. Additionally, the lime mud cakes or balls in the calciner. As a result, frequent shut downs are encountered. Severe mechanical means, such as chains or even cannon shot are required to break-up the balled lime mud. If an economical process could be devised so as to both avoid the fouling of an auger screw conveyor which carries the mud to a lime kiln and the avoidance of balling within the lime kiln, a long felt need in the art would be fulfilled.

It is, therefore, a principal object of the invention to provide free flow transfer of lime mud to a calciner. It is a further object of the invention to provide a process whereby balling of lime mud does not occur in a calciner. It is a still further object of the invention to decrease the fuel requirements of the kiln by reducing the amount of water entering it with lime mud cake. Other objects and advantages will be noted after a reading of the ensuing description.

To these ends, it has been unexpectedly found that lime mud can be stabilized so that it does not foul transporting means, such as auger screws, and avoids balling in a calciner by adding a surface active agent to the same. Surprisingly, water spraying under pressure on the transporting means to keep the auger screw open as well as balling of the lime mud in the calciner are mitigated or entirely eliminated.

According to the process of the present invention, lime mud comprising water and calcium carbonate in the form of from 30% to 40% solids slurry is withdrawn to a zone into which there is added and admixed a surface active agent, as hereinbelow defined, diluted with water and held for a period of from 15 minutes to 2 hours. The latter mixture is next filtered to remove the liquor and to recover a filter cake which is fed through a conveying means such as a screw auger to a calciner without (a) fouling the conveying means or screw auger and (b) causing the resultant filter cake to ball in the calciner.

In general, any surface active agent decomposable at a temperature below 1500° F can be employed in the process of the invention. Illustrative surface active agents are: (1) sodium isopropylnaphthalene sulfonate (Aerosol OS), (2) sodium dioctyl sulfosuccinate (Aerosol OT), (3) sodium dihexyl sulfosuccinate (Aerosol MA), (4) nonylphenolethyleneoxide condensate (Jefferson Chemical's Surfonic N-95) prepared by reacting one mole of nonyl phenol with 9.5 moles of ethylene oxide, (5) sodium diamyl sulfosuccinate, and (6) ethanolated alkyl guanidineamine complex (Aerosol C-61). Any of the foregoing surface active agents or a mixture of the same is effective and, particularly, Aerosol OT which is readily available and economical is preferred. It is a good practice that the surface active agent be added at miniscule but effective amounts ranging from about 0.3 pound to about 5.0 pounds per ton of dry calcium carbonate, and preferably between about 0.5 pound to about 2.0 pounds per ton.

Advantageously, the process of the invention is applicable to either batch or continuous procedures. For instance, the desired surface active agent may be continuously fed to lime mud as it emanates from the caustic tank after removal of the white liquor comprising sodium sulfide and sodium hydroxide. In this manner, the amount of surface active agent is adjusted to a predetermined level and then permitting the mixture to be filtered as by a drum filter so as to readily transfer the resultant filter cake to a kiln. During filtration, the bulk of the moisture is removed. Nonetheless, the filter cake does not adhere to or foul the screw auger which carries the filter cake to a kiln. The kiln is operated at standard calcining temperatures for converting calcium carbonate to calcium oxide, namely, between 1500° F. and 2000° F.

To facilitate an understanding of the invention, the following examples are presented for purposes of illustrating certain specific details thereof. The invention is not to be limited thereby except as defined in the claims. Unless otherwise noted, all parts are by weight.

EXAMPLE 1

To 1500 parts of calcium carbonate mud emanating from a white liquor clarifier employed in Kraft process are added 1.5 parts of sodium dioctyl sulfosuccinate together with 30 parts of water. The mixture is next pumped to a drum filter where the bulk of the water, usually from about 60%–70% is removed. Resultant filter cake is then conveyed by means of a screw auger to a calciner. The latter is next heated to a temperature of about 1800° F. No caking on or fouling of the transfer auger or balling in the kiln is observed even though the lubricating spray water of the auger had been turned off previously.

The procedure is continued continuously for a 48 hour period without observing any adverse effects of fouling or balling with attendant savings in fuel to heat the kiln due to lack of caking or balling in the kiln. The clear and uncaked kiln permits excellent heat transfer thereby substantially conserving fuel which is otherwise additionally required to heat the kiln. There is further realized a substantial saving in manpower because constant attention to the auger is eliminated as is the continuous manual removal of lime mud balls from the fire box of the kiln.

EXAMPLE 2

The procedure of Example 1 is repeated in every detail except that the surface active agent is omitted. There are observed both (a) fouling of the screw auger which had to be cleared by frequent water hosing and (b) balling of the lime mud in the kiln.

EXAMPLE 3

Repeating the procedure of Example 1 except that in lieu of sodium dioctyl sulfosuccinate, there is substituted Jefferson Chemical Surfonic N-95 surfactant, namely nonyl phenol (1mol) ethylene oxide (9.5 mols) condensate, with attendant good results with respect to fouling and balling.

EXAMPLE 4

In the procedure of Example 1, a mixture of sodium dioctylsulfosuccinate and sodium isopropylnaphthalene (50/50) is employed in place of the sodium dioctylsulfosuccinate. Conversion of calcium carbonate to calcium oxide occurs without balling in the calciner or kiln or fouling of the conveyor to the kiln.

The process is conducted continuously without shut down for periods in excess of 72 hours.

I claim:
1. A process for stabilizing lime mud so as to eliminate balling during calcination of the same which consists essentially in the steps of: incorporating a surface active agent decomposable at a temperature below 1500° F into lime mud comprising calcium carbonate wherein said surfactant is added in an amount ranging from 0.3 pound to 5.0 pounds per ton of dry calcium carbonate, filtering said treated lime mud, and thereafter calcining said treated lime mud at temperatures ranging between 1500° F and 2000° F to recover calcium oxide absent balling during calcination.

2. The process according to claim 1 wherein the surfactant is a member selected from the group consisting of sodium isopropylnaphthalene sulfonate, sodium dioctyl sulfosuccinate, sodium dihexyl sulfosuccinate, sodium diamyl sulfosuccinate, ethanolated alkyl guanidineamine complex, and ethoxylated nonyl phenol.

3. The process according to claim 1 wherein the surfactant is sodium isopropylnaphthalene sulfonate.

4. The process according to claim 1 wherein the surfactant is sodium dioctylsulfosuccinate.

5. The process according to claim 1 wherein the surfactant is sodium dihexylsulfosuccinate.

6. The process according to claim 1 wherein the surfactant is sodium diamyl sulfosuccinate.

7. The process according to claim 1 wherein the surfactant is ethanolated alkyl guanidineamine complex.

8. The process according to claim 1 wherein the surfactant is ethoxylated nonyl phenol.

* * * * *